March 12, 1957 A. J. CHASE 2,785,231

TELEPHONE SET WITH AMPLIFIER

Filed Feb. 25, 1954 3 Sheets-Sheet 1

INVENTOR
A. J. CHASE
BY W. L. Keefauver
ATTORNEY

INVENTOR
A. J. CHASE
BY W. L. Keefauver
ATTORNEY

INVENTOR
A. J. CHASE
BY W. L. Keefauver
ATTORNEY 2,785,231

TELEPHONE SET WITH AMPLIFIER

Albert J. Chase, Summit, N. J., assignor to Bell Telephone Laboratories, Incorporated, New York, N. Y., a corporation of New York Application February 25, 1954, Serial No. 412,448

4 Claims. (Cl. 179—81)

This invention relates to telephone substation circuits which provide amplification of received signals. Such sets may be employed, for example, by subscribers having impaired hearing or by subscribers at the end of long loops whose received signals are normally weak.

Included among the various objects of the invention are to make practical amplified telephone subscriber service of a high quality which will not interfere with or impair normal service, i. e., no amplification, and to improve telephone service for people having impaired hearing.

Other objects are to decrease the cost and circuit complexity of telephone subsets suitable either for long loop locations or for hard-of-hearing subscribers and to integrate means for amplifying received signals into a conventional subset without appreciable disturbing of the conventional subset. Another object is to accomplish the foregoing with no modification of existing central office circuitry.

Subsets employing vacuum tubes for amplifying received signals have previously been proposed; see, for example, J. W. Foley Patent 1,655,537, dated January 10, 1928, and K. S. Johnson Patent 1,696,274, dated December 25, 1928. These circuits, however, are in general impractical for large scale application because of the power required for the amplifier which must be supplied either locally or over the line. The present invention, however, relates to subsets providing amplification of received signals which are wholly practical and susceptible of large scale application in existing plant equipment. One feature of the invention is that the amplifier may be supplied with operating power over the line with no modification of existing central office equipment and with extremely simple modifications of standard subset equipment. Another feature of the invention is that normal operation of the set, that is, with no amplification, may be had without impairing the normal high quality properties of the standard set in which the invention may be incorporated. A further feature of one embodiment is that manual operation of a switch is required to insert the amplifier in the receiving branch and the amplifier is automatically disconnected from the receiving branch when the handset is replaced on the base at the end of a call.

Figure 1:
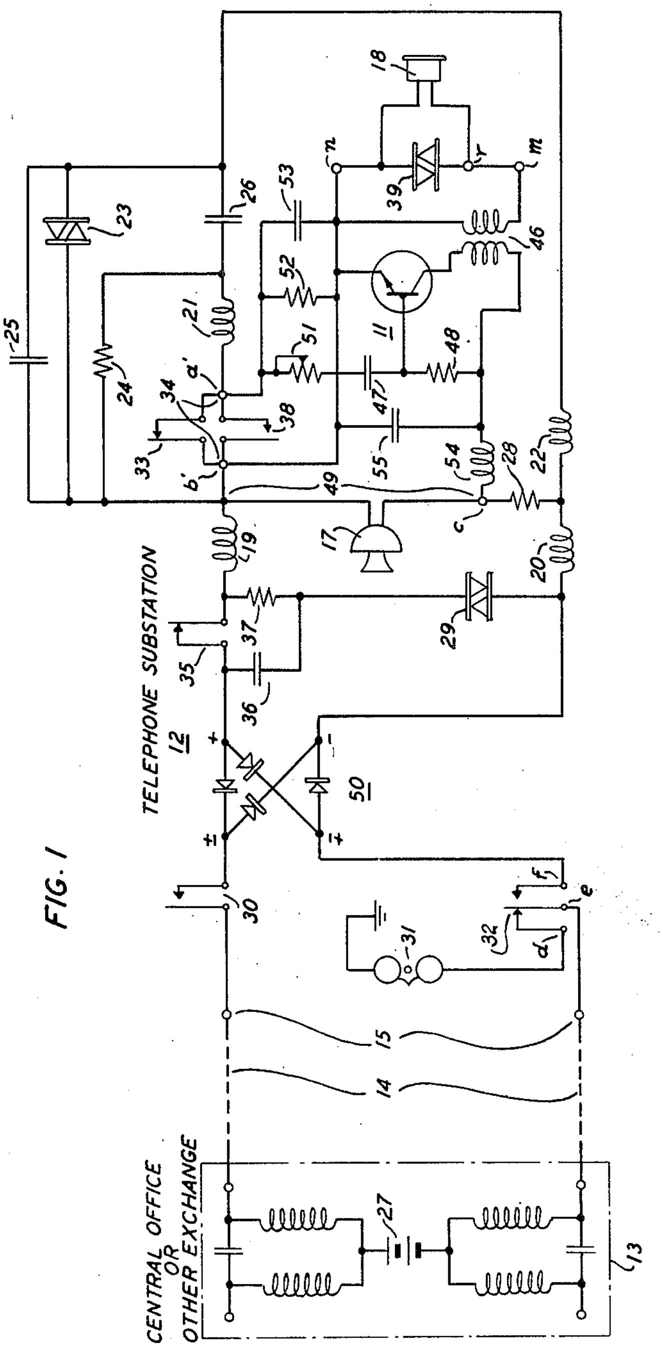
Figure 2:
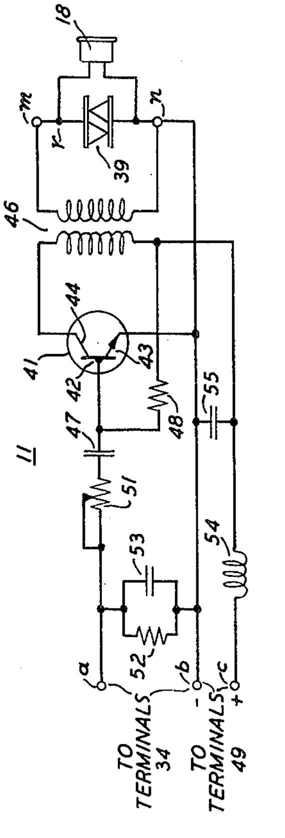

These and other features are attained in part by employing a transistor as the amplifying element and may be understood in more detail from a consideration of the following detailed description which is illustrated by the attached drawing, of which:

Fig. 1 illustrates in detail the circuit connections of a telephone substation circuit incorporating features of the invention; and Fig. 2 is a circuit diagram of the amplifier portion of the substation circuit illustrated in Fig. 1.

With the exception of the amplifier 11 including its biasing circuits, the substation circuit 12 shown in Fig. 1 is very similar to a circuit described in detail in H. F. Hopkins Patent 2,629,783, dated February 24, 1953. This circuit is of the common battery anti-sidetone type and is connectable to a central office or other exchange 13 by a telephone line 14 which may be connected to the subset terminals 15. The substation circuit comprises a transmitter 17 and a receiver 18 which are connected in an anti-sidetone circuit by means of a multiple winding induction coil 19—22. The four windings of this coil are mutually coupled to obtain a conjugate relation between the transmitter and receiver. This conjugate relation is attained by proper selection of the turns ratios and by proper poling of these windings.

Since the various substation circuits connected to a given central office are usually located at different distances from the central offices, this conjugate relation may not hold for all sets. A sidetone balancing circuit comprising primarily the varistor 23 is therefore connected effectively in shunt with the receiver terminals 34 to provide a variable sidetone balance which will depend on the distance of the circuit from the central office. This arises because the impedance of the shunting varistor 23 is non-linear and depends on the amount of direct current flowing from the central office battery 27 through it. Further, the latter depends on the impedance of the loop, which in turn depends on the distance of the subscriber from the central office. The resistor 24 connected in shunt with the varistor 23 reduces the degree of non-linearity of the latter to the desired degree so as to compensate for set to set irregularities arising from differences in loop length. The condenser 25 aids in maintaining proper balance on longer loops by reflecting the predominantly capacitive reactance of such loops. The condenser 26 blocks direct current from the receiver 18 and also from the resistor 24 so as to avoid undue power loss in the latter.

Equalization is provided by the varistor 29 which may, for example, comprise silicon carbide or copper oxide as may also varistor 23. Varistor 29 also has a non-linear resistance characteristic and one such that the transmission level at the line terminals 15 of the substation circuit will be fairly constant regardless of the impedance of the subscriber's loop. Since the efficiency of the transmitter 17 will vary with the amount of direct current flowing through it and since the non-linear element 29 will shunt variable amounts of direct current from the transmitter, a resistor 28 is connected in series with the transmitter to keep this variation in transmitter efficiency, on a percentage basis, low. In addition to reducing the transmitted power on short loops, the low alternating current impedance placed across the line terminals 15 on short loop conditions will also reduce the received power level at the set if the current sensitive element has the proper coefficient of non-linearity.

A conventional ringer 31 can be connected either between one side of the line and ground near the input terminals as shown, or directly across the line, as desired. Switch hook contacts 30 and 32 are provided in both sides of the line and a switch hook contact 33 is provided across the receiver terminals 34. In the conventional manner, the switch hook contacts 30 and *e* and *f* of 32 are normally open while contact 33 is normally closed, short-circuiting the receiver. Further, *d* and *e* of 32 are normally closed, connecting the ringer 31 to the line. When the handset is lifted from the cradle, contacts *d* and *e* of 32 are opened, contacts 30 and *e* and *f* of 32 are closed and then contact 33 is opened. Replacing the handset in the cradle first short-circuits the receiver by closing contact 33 and then opens 30 and *e* and *f* of 32. Contact 35 represents the normally closed dial pulsing contacts which are opened and closed by operating the dial to send signaling impulses to the central office. Condenser 36 and resistor 37 form a filter across the dial pulsing contacts 35. When the dial is operated, the receiver is short-circuited by the dial off-normal contact 38. The mechanical means which operate the various switch hooks and contacts are not illustrated since they are well known in the art.

The substation circuit thus far described, assuming the receiver 18 and the click-reducing varistor 39 to be connected directly across the receiving terminals 34, comprises in general the present conventional high quality subset, further features of which are described in the above-noted Hopkins patent.

In accordance with principles of the invention, amplification of received signals is provided by a transistor amplifier 11 which in many respects is substantially the same as the one illustrated in Fig. 19 of an article entitled "Some circuit properties and applications of n-p-n transistors" by R. L. Wallace, Jr., and W. J. Pietenpol, which appeared in the Bell System Technical Journal for June 1951. The operation of the amplifier may be understood more clearly by referring to Fig. 2 where it is illustrated in more convenient form.

Amplifier 11 comprises an n-p-n junction transistor 41 connected in common emitter configuration. Input signals are applied between the base and emitter electrodes 42 and 43 by input terminals *a—b*, and the output is taken from the collector and emitter electrodes 44 and 43 and applied to the receiver by a transformer 46. Terminals *m—n* represent the output terminals of the amplifier. Transformer 46 matches the high impedance output of the transistor to the receiver and also isolates the latter for direct currents. The input signals are coupled to the base 42 through a coupling condenser 47 so that the base will float at a positive potential with respect to the emitter. In order to increase the collector current and hence the power output, a high resistance path between the base and collector is provided by the resistor 48.

To avoid the need of a local battery at each subscriber's set, direct current for providing power and biasing voltages for the transistor are derived from the line current. In other words, power and biasing voltages are supplied by the central office substation battery 27 which is common to all subscribers connected to this central office. In the embodiment illustrated, power is derived from a low impedance in the transmitter branch, namely the 50 ohm transmitter 17. Terminals 49, one of which is electrically common with the receiver terminals 34, therefore comprise the power supply terminals to which terminals *b—c* of the amplifier are connected. By this connection, power and biasing currents are applied between collector 44 and emitter 43, and biasing current between collector 44 and base 42.

Figure 3:
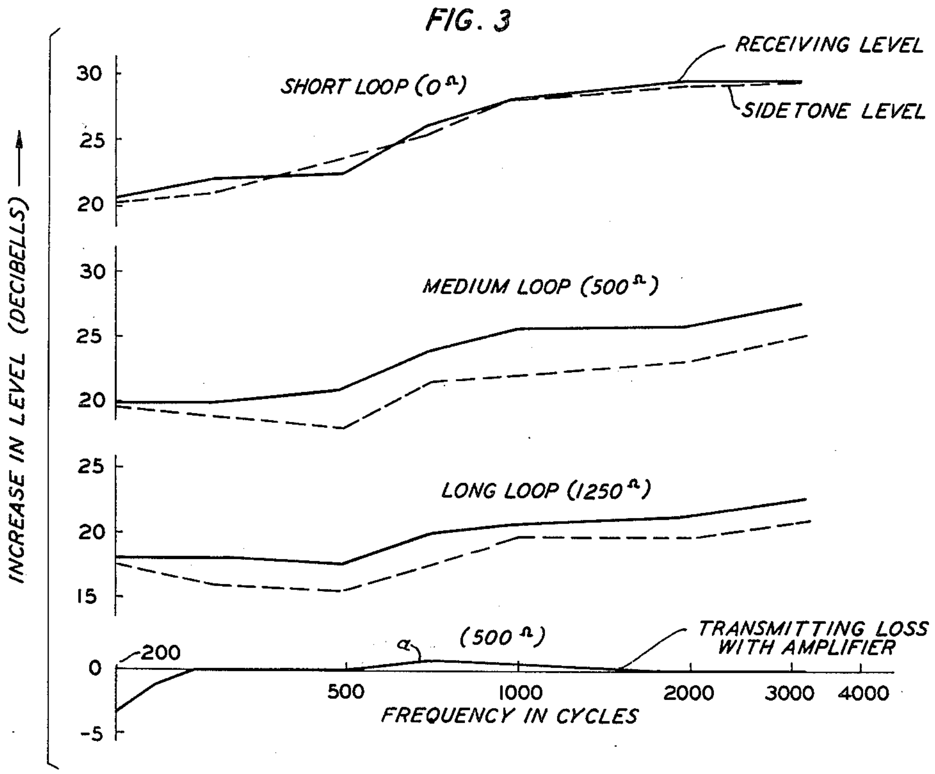

The direct current power for the transistor may alternatively be derived from across the 22 ohm resistor 28 which is connected in series with the transmitter or across resistor 28 and the transmitter in series. The former has the advantage of removing the shunting effect on the transmitter but has the disadvantage of requiring an additional terminal at the end of the resistor remote from the transmitter. In present standard sets, external terminals in the transmitter branch are provided only at either end of the transmitter. Further, the biasing circuit, when connected as shown in Fig. 1, shunts only about seven percent of the power from the transmitter, which is relatively insignificant. This loss is illustrated in Fig. 3, curve *a*, and will be described more fully below.

To insure that the operating voltages applied to the transistor at terminals *b—c* are always poled in the same way, a bridge circuit 50 comprising four diodes is inserted between the line terminals 15 and the talking circuit to accommodate central office battery reversals which may occur in the course of various connections, either at the subscriber's set or at the central office. This bridge introduces negligible transmitting and receiving losses and insures that regardless of the relative polarity of the input line terminals 15, the voltages at the input to the talking circuit will always be poled as illustrated in Fig. 1. It further has little effect on *d—c* supervision of the set. The bridge 50, as illustrated, is connected to provide the relative polarities indicated which are proper for an n-p-n junction transistor. If a p-n-p junction transistor were employed as the amplifying unit, the bridge 50 should be reversed to obtain the opposite relative polarities. The electrolytic condensers 47 and 55 should also be reversed.

Since loop length and subscriber hearing ability will vary widely, a manual gain control is provided so that the subscriber may readily adjust the gain of the amplifier. Any one of several well known means of providing variable gain control may be employed. For example, a resistor having a variable tap could be connected in series with the emitter electrode 43 much in the same manner as shown, for the generally analogous vacuum tube circuit, in C. N. Nebel Patent 2,022,972, dated December 3, 1935. Such an arrangement would obtain the advantages of negative feedback at low gain settings including, for example, a uniform low gain adjustment, despite variation in transistor parameters either with time or from set to set. For purposes of illustration, another method is shown comprising a resistor 51, having a variable tap, connected in series with the base electrode 42 and amplifier input. The simple series attenuation provided by this arrangement will give a similar range of gain control to that provided by the arrangement described above. In either case, a knob controlling the variable tap may be conveniently located on the outer casing of the subset, for example, near the dial.

The amplifier shown in Fig. 2 is inserted in the substation circuit of Fig. 1 by connecting the signal input terminals *a—b* across the receiving terminals 34 of the subset and by connecting the power supply terminals *b—c* across terminals 49. The resistor 52 connected across the signal input terminals provides a controlled load at terminals 34 and the condenser 53 connected in shunt with it provides a radio frequency by-pass to minimize any radio frequency signals which may be on the line 14 from being amplified and applied to the receiver.

Although varistor 39 is primarily relied on to prevent clocks or high intensity sound from reaching the ear, the transistor 11 also provides similar protection due to its inherent limiting action at "saturation."

In accordance with principles of the invention an amplifier has been incorporated in an otherwise standard telephone set without disrupting normal operation of the set. For example, the previous set had been carefully designed to achieve an optimum sidetone balance. This balance has not been disturbed appreciably even with the addition of an amplifier which derives its operating voltages and currents from the line. Also, for example, the circuit employed to derive power for the transistor from the line current results in a possible source of undesired feedback since one input terminal of the amplifier is common to both the signal input terminals 34 and the power supply terminals 49.

These undesired effects are prevented, however, by the series inductor 54 and the shunt capacitor 55 which are connected in the power supply circuit. These elements serve in part as a filter to attenuate transmitter voltage variations as the transmitter is agitated which are applied to the transistor for power and bias between collector 44 and emitter 43. Further, they function to reduce undesired feedback and serve also to leave the desired sidetone balance undisturbed.

In the selection of elements 54 and 55 a 4 mf. tantalum electrolytic condenser was chosen as element 55 because of its extremely small size and superior characteristics. An inductor for element 54 was selected with the following considerations in mind:

First, this element should be as small as possible;

Second, the shunting impedance imposed on the transmitter 17 should be kept as high as possible over the signal frequency band to prevent degrading signal transmission; and Third, its direct-current resistance should be as low as possible so as not to interfere with power supply to the transistor. An inductor which filled all these requirements had an inductance of .2 henries and a direct-current resistance of 175 ohms.

The curve diagram *a* in Fig. 3 illustrates the effect of these two elements 54 and 55 on the transmission. In this diagram transmitting loss is plotted against frequency on a logarithmic scale. With no amplifier shunting the transmitter 17 this loss should be zero. Curve *a* shows the loss with the amplifier present and shows that above 300 cycles the transmission is reduced no more than 1 db. Below 300 cycles the transmitting loss drops sharply but in this range this loss is unimportant.

The upper three sets of curves in Fig. 3 show that the difference between the sidetone level and the receiving level over the signal frequency band stays fairly constant and is not appreciably affected by the variations in gain. These curves are plotted for the amplifier set at maximum gain and for various length loops. That these levels relative to each other stay fairly constant is important primarily from a psychological standpoint since it has been found that the average subscriber prefers a fairly constant relation between the two.

Figure 4:
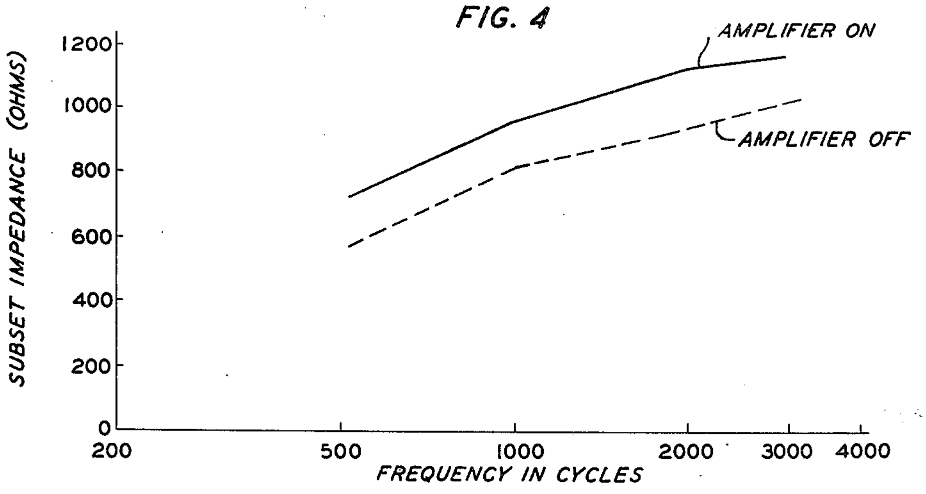

The curves in Fig. 4 illustrate the effect of the amplifier on the impedance of the telephone set, that is, the impedance looking in at the line terminals 15. The addition of the amplifier increases the set impedance but not sufficiently to disrupt supervisory signaling or other balances.

One feature of the circuit described is that the transistor amplifier can provide efficient amplification even though the D.-C. supply voltage is low, for example, on the order of a few volts. Further, this amplification will not be appreciably affected even though the supply voltage varies either with time or from set to set. No modification of existing central office equipment is therefore required, since voltages suitable for supplying direct current to the transistor will generally be available at all subscriber locations.

To give further meaning to the description specific values of several of the elements which were employed in an actual subset will be given, although it should be understood that these values are merely illustrative and not restrictive. All capacitors in the amplifier, Fig. 2, were 4 mf. tantalum capacitors while capacitor 53 was .02 mf. Potentiometer 51 in the configuration had a total resistance of 25,000 ohms although when moved to the emitter branch, as suggested above, a 500 ohm potentiometer gave substantially the same range of gain control. It may be noted that the ratio between these latter two values is approximately $$\frac{1}{1-\alpha}$$

where $\alpha$ was approximately .98. The transistor was a grown junction n–p–n although a diffused alloy n–p–n or p–n–p transistor could be used. Point contact transistors, at present, are in general unsatisfactory for this application.

Receiver 18 had an impedance of 150 ohms (at 1000 cycles) and the output transformer 46 of the amplifier had a turns ratio of 1000:150. Several of the resistors had the following values:

| | Ohms |
|---|---|
| R52 | 1,000 |
| R48 | 20,000 |
| R28 | 22 |

An amplifier according to these specifications provided an insertion gain at 1000 cycles of about 20 db on a long (1250 ohms) loop and 27 db on a short (0 ohm) loop.

Figure 5:
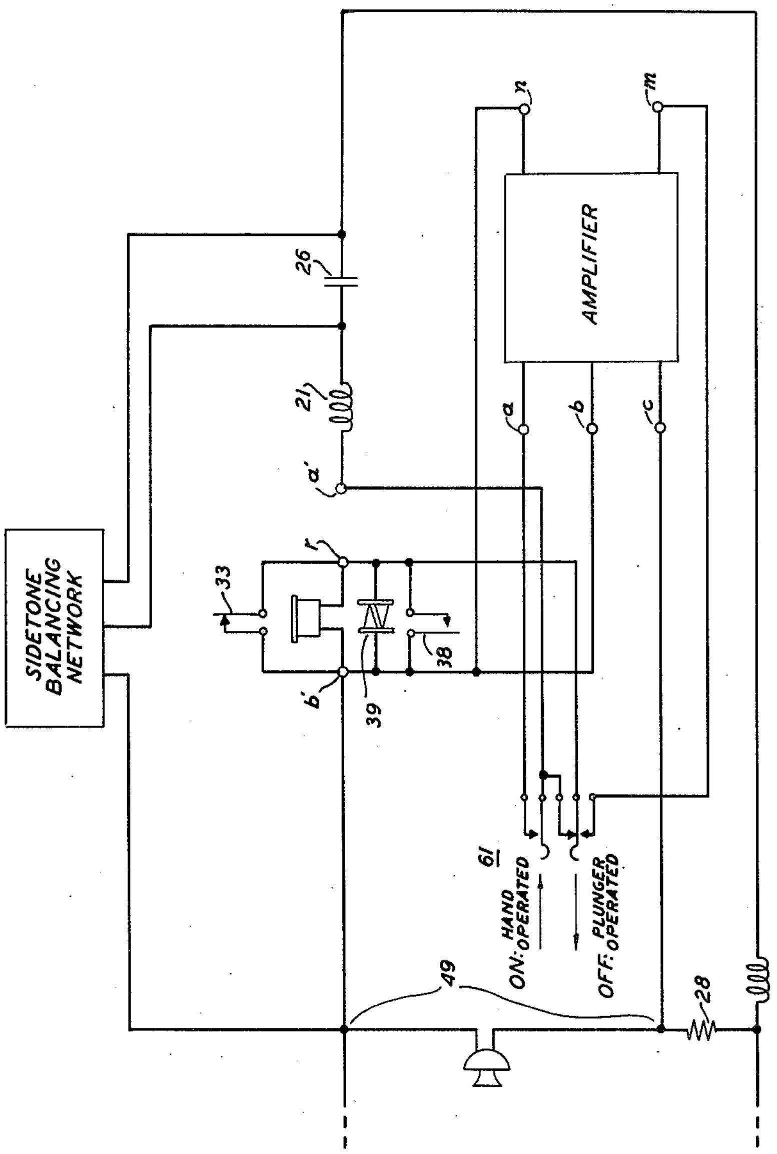

According to further principles of the invention, a simple switching arrangement can be incorporated in the set to automatically exclude the amplifier from the circuit when the handset is placed in the cradle. Such an arrangement is illustrated in Fig. 5. This figure illustrates the talking portion only of the subset and corresponding identifying numbers and letters have been used where feasible. The switch 61 is illustrated as a key and may comprise one of the plungers which is extended one step above the normal off-hook position by hand and is turned off automatically when the handset is replaced in the cradle. A plunger-operated switch capable of performing this function is described in C. L. Krumreich Patent 2,580,185, dated December 25, 1951.

When the amplifier is off, receiver terminal *r* is connected directly to terminal *a′* and input terminal *a* of the amplifier is disconnected. Upon manual operation of the switch 61, receiver terminal *r* is transferred to the output terminal *m* of the amplifier and input terminal *a* of the amplifier is connected to terminal *a′*. The latter connections correspond with those illustrated in Fig. 1 whereas with the amplifier off, the connections correspond generally with those described in the Hopkins patent noted above.

This switching arrangement does not disturb the power supply circuit which is permanently connected to the amplifier but the low power drain of the transistor is, for all practical purposes, negligible. Receiver terminal *b′* and amplifier terminals *b* and *n* are also permanently connected and undisturbed by the switch 61. It may be noted that in Fig. 5 the dial off-normal contact 38 and the click preventing contacts 33 are connected directly across the receiver 18.

The switching arrangement described has the advantage of preventing the situation of a normal-hearing subscriber commencing a call with the amplifier set for high gain. This might arise if the previous user were a person of very poor hearing ability. With the switching arrangement shown, however, the amplifier is automatically excluded from the circuit at the end of each call and should a subscriber desire amplification he must take positive action by operating a switch which should be conveniently located on the subset casing as one of the switch hook plungers.

It can be appreciated that in view of the small size of junction transistors and the small number of additional circuit components required for the amplifier, the addition of an amplifier, even if a switch as illustrated in Fig. 5 is provided, will require very little space in the subset.

It should be noted that even without the switch hook cutout arrangement just described the telephone set can still be operated essentially as a normal set by reducing the gain as desired.

Although a specific embodiment of the invention has been shown and described, it is to be understood that it is but illustrative and that various modifications may be made therein without departing from the spirit and scope of the invention.

What is claimed is:

1. In a telephone system having a central office including a source of direct current, substation circuits, and transmission lines from said central office for supplying direct current and speech signals to said substation circuits, a substation circuit connected to one of said lines and having a transmitter branch including an impedance, a receiver branch, a receiver, an amplifier comprising a transistor having base, collector, and emitter electrodes, means for applying said received speech signals between said base and emitter electrodes, means for deriving amplified speech signals from between said collector and emitter electrodes, means for applying said amplified signals to said receiver, and means for applying direct current received from said central office to said transistor comprising a circuit including series inductance and shunt capacitance for connecting said collector and emitter electrodes, respectively, to opposite sides of said impedance.

2. The combination in accordance with claim 1 wherein said impedance comprises a transmitter.

3. In a telephone system having a central office including a source of direct current, substation circuits and transmission lines from said central office for supplying direct current and speech signals to said substation circuits, a substation circuit connected to one of said lines, said substation circuit comprising a transmitter branch, a receiving branch, a receiver, an amplifier comprising a transistor having base, emitter, and collector electrodes, a pair of signal input terminals for said amplifier connected to a first pair of said electrodes, a pair of signal output terminals for said amplifier connected to a second pair of said electrodes, means for connecting said signal input terminals to said receiving branch, means for connecting said signal output terminals to said receiver, an impedance element connected in said transmitter branch, and power supply circuit means comprising means for connecting a pair of said electrodes in shunt with said impedance, said circuit means comprising a series inductor and a shunt capacitor.

4. The combination in accordance with claim 3 wherein the series impedance of said inductor is high relative to the impedance of said impedance element for frequencies over 300 cycles, and wherein the direct current resistance of said series inductor is low.

References Cited in the file of this patent

UNITED STATES PATENTS

| | | |
|---|---|---|
| 1,655,537 | Foley | Jan. 10, 1928 |
| 2,337,900 | King | Dec. 28, 1943 |
| 2,550,518 | Barney | Apr. 24, 1951 |
| 2,663,796 | Raiskech et al. | Dec. 22, 1953 |